United States Patent [19]

Gunderson et al.

[11] 3,990,259

[45] Nov. 9, 1976

[54] PIPE SUPPORT FOR FLOATING PIPELAYING VESSEL AND METHOD OF OPERATING SAME

[75] Inventors: Richard H. Gunderson; Charles G. Lyons, both of Houston, Tex.

[73] Assignee: Exxon Production Research Company, Houston, Tex.

[22] Filed: Jan. 24, 1975

[21] Appl. No.: 543,730

[52] U.S. Cl. .................................................. 61/108
[51] Int. Cl.² ........................ B63B 35/04; F16L 1/00
[58] Field of Search .................. 61/72.3, 72.1, 46.5; 114/43.5 VC

[56] References Cited
UNITED STATES PATENTS 3,390,532  7/1968  Lawrence ............................ 61/72.3
3,670,511  6/1972  Gibson et al. ........................ 61/72.3
3,826,099  7/1974  Lovie .................................. 61/46.5

*Primary Examiner*—Jacob Shapiro

[57] ABSTRACT

Apparatus for supporting pipe as it is laid from a vessel in a body of water is described. The apparatus includes a stinger movable from an operating position supporting the pipe to a protected position beneath the vessel. Apparatus for moving the stinger from the operating position to the protected position and securing it to the vessel is also provided.

6 Claims, 6 Drawing Figures

FIG. I

PIPE SUPPORT FOR FLOATING PIPELAYING VESSEL AND METHOD OF OPERATING SAME

BACKGROUND OF THE INVENTION

1. Field of the Invention

The present invention relates to improved method and apparatus for supporting pipe being laid in a body of water from a floating vessel.

2. Description of the Prior Art

In laying pipe on the floor of a body of water from a floating vessel in the conventional manner, a support structure or stinger is employed which extends outwardly from the vessel into the water to support the pipe. Failure to provide such a support structure may result in the weight of the pipe developing large stresses that can buckle or rupture the pipe. The problem of proper pipe support is compounded significantly in deep water, in heavy seas or with large diameter pipe, requiring the use of substantially larger stingers.

These outwardly extending structures present severe problems in heavy seas or adverse weather conditions. Because of the size of the stinger, environmental forces acting on it create tremendous bending moments at the hinge, frequently leading to hinge failures. Accordingly, stingers are normally detachably connected to the vessel so that they can be separated from the vessel during heavy seas or other adverse weather conditions.

Disconnection of the stinger from the vessel during heavy seas is, however, also a complex task and poses the possibility of damage to either the vessel or stinger. When these relatively massive stingers are detached and left to float free, they are a hazard to navigation and may damage the lay barge or a passing vessel. Further, reconnection of the floating stinger to the vessel must be delayed until the adverse weather subsides. Even then, however, it is a complex operation and often results in damage to the stinger, the vessel or both due to the relative motion therebetween.

A system has been proposed to raise the stinger out of the water at the onset of severe weather and to lower it into the operating position after the adverse weather subsides. Such a system, however, results in an elongated, massive cantilever beam extending off one end of the vessel. Even in the upraised position the stinger thus may be subject to significant environmental forces, leading to the development of large moments at the hinge which may damage the stinger and render it useless for continued operation.

Thus, the necessity of detaching and reconnecting or otherwise protecting the stinger during severe weather conditions poses serious problems.

SUMMARY OF THE INVENTION

The present invention relates to an improved pipe support apparatus and method of use with pipelaying vessels which alleviates the above problems. The apparatus of the invention includes a stinger movable from an operating position in which the pipe is supported to a protected position in which it is tucked under the vessel. Means are also provided for moving the stinger from one position to the other and for securing the stinger to the vessel once the stinger is in the tucked under position.

In accordance with the invention, at the onset of inclement weather the stinger is moved from its operating position to the protected position and then secured to the vessel. This has the advantage of avoiding the problems normally encountered in disconnecting and reconnecting the stinger. Also by tucking the stinger under and securing it to the vessel, the substantial weather induced moments on the hinge are avoided. Further, the stinger can be returned to the operating position in rougher seas than those in which reconnection would normally be attempted, permitting more prompt resumption of pipelaying operations. It will thus be seen that the present invention offers significant advantages over systems proposed heretofore.

DESCRIPTION OF THE PREFERRED EMBODIMENT

Figure 1:
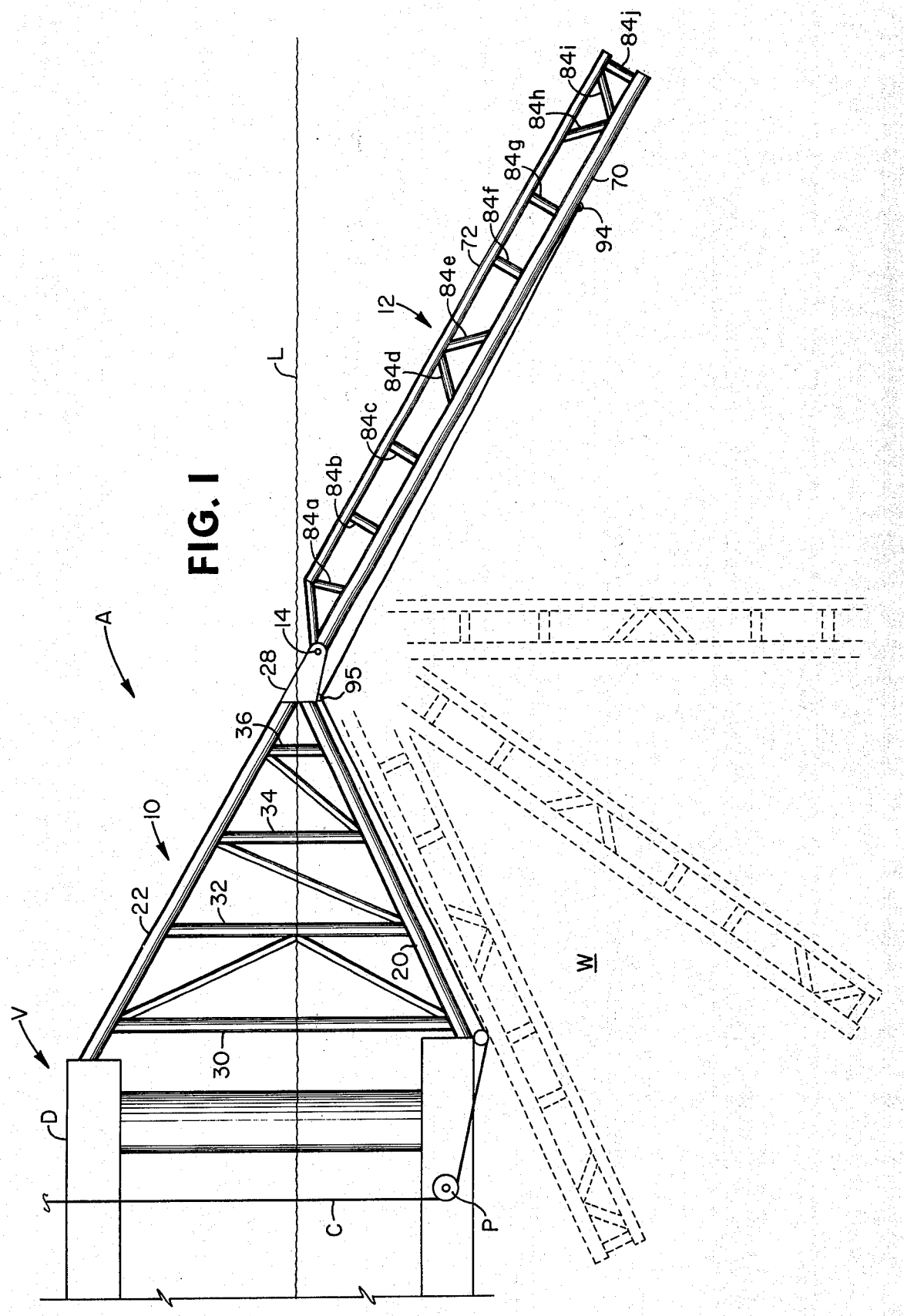
FIG. 1 is an elevation view of the pipe support apparatus of the present invention attached to a floating vessel and illustrates in phantom the movement of the pipe support apparatus to the tucked under position.
Figure 2:
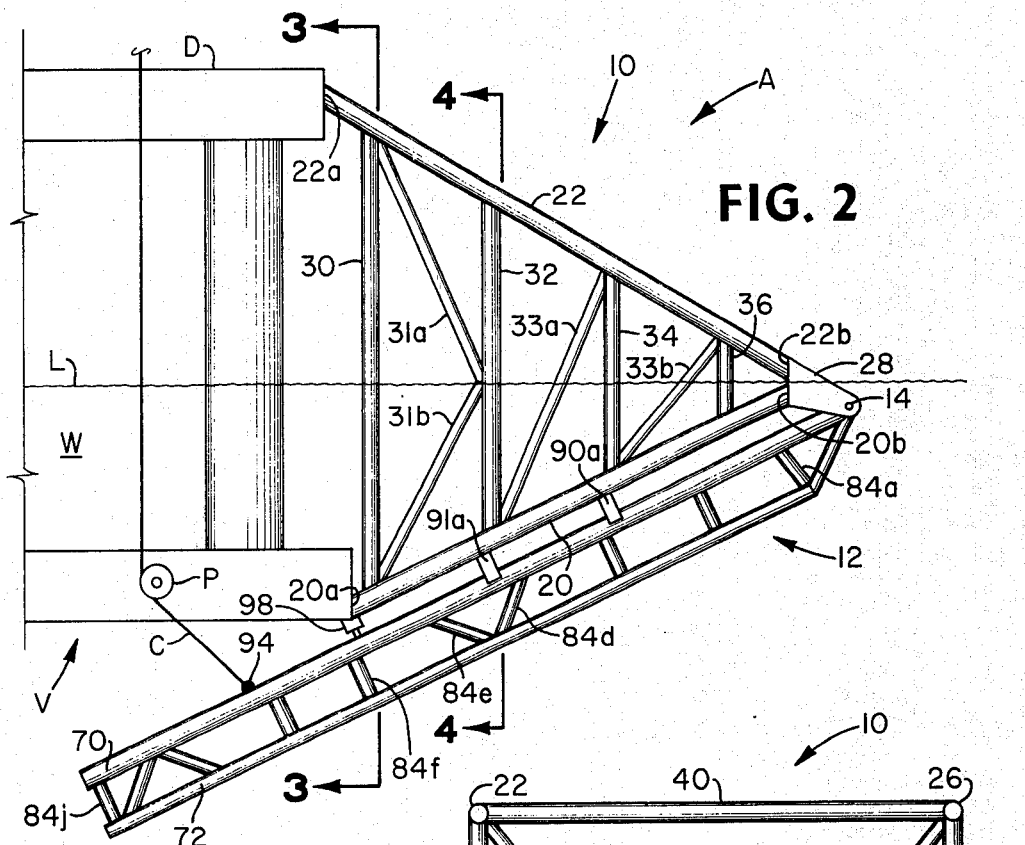
FIG. 2 is a view similar to FIG. 1 illustrating the pipe support apparatus in the secured position.

The apparatus of the present invention is generally designated by the reference character A in FIGS. 1 and 2. The pipe support apparatus 12 is attached to ramp 10 which is secured to and forms a part of a floating pipelaying vessel, designated V. The support apparatus or stinger serves to support the pipe during its movement from the pipelaying vessel to the floor (not illustrated) of the body of water W. The piplaying vessel with which the apparatus is used may be a semi-submersible vessel, as depicted in FIG. 1, or it may be some other suitable marine vessel, if desired.

As is known to those skilled in the art, tubular conduits or sections (not illustrated) of the pipe to be laid are joined by welding or some other suitable fashion on the working surface or deck D of the vessel to form the pipeline to be laid. As additional sections are joined to the pipeline, the floating vessel is moved forward to enable the formed pipe to move off the working deck and into the body of water to the submerged location at the floor thereof (not illustrated). The pipe support apparatus of the present invention functions to support the formed continuous pipe as it is lowered into the water during pipelaying operations.

As indicated, the pipe support apparatus of the present invention is adaptable for use with any type of floating vessel. In FIGS. 1 and 2 a semi-submersible pipelaying vessel is illustrated, but other hull designs such as a barge or ship may also be used with the present invention. Furthermore, the vessel may or may not be self-propelled. Because of its desirable motion charactersistics, the semi-submersible hull is preferable for pipe-laying operations in seas having heavy waves and adverse weather.

The apparatus of the present invention includes a stinger 12 which is shown pivotally connected to an inner portion or ramp 10 which is affixed to and forms a part of the vessel. It will be appreciated that it is not essential that the vessel with which the apparatus of the invention is used include a ramp; however, due to the nature of the semi-submersible hull design, the working deck normally is located a substantial distance above the mean water level L. Accordingly, it is contemplated that a ramp such as that designated by numeral 10 or some similar transition segment will generally be used with semi-submersible hulls. Due to the movable interconnection of the stinger 12 to the vessel, the stinger 12 may be moved from a pipe supporting position (FIG. 1) to a folded or tucked under position (FIG. 2) when severe weather or heavy seas are anticipated or encountered.

As best illustrated in FIG. 1, the stinger is pivotally connected at pin 14 between parallel hinges 28 to enable movement of the stinger from the operating position for supporting the pipe to any desired location in the body of water. It is to be noted that the stinger is capable of downward movement through an arc of at least 90 degrees below horizontal. The stinger is movable about pivot connection 14 through the positions illustrated in phantom in FIG. 1 to a protected position, illustrated in FIG. 2, where is it is protected from damage during high waves or other adverse weather conditions.

Stinger 12 is preferably formed of a frame having four substantially parallel longitudinally extending members 70, 72, 74 and 76. As best illustrated in FIG. 4, the members 70, 72, 74 and 76 are in a rectangular pattern. The tubular members 70 and 72 are connected at spaced locations (FIG. 1) by bracing members 84a, 84b, 84c, 84d, 84e, 84f, 84g, 84h, 84i and 84j. The cross-braces 84a – 84j may be disposed in any desired relationship between the substantially parallel frame members 70 and 72. Preferably, corresponding bracing is also provided between the substantially parallel frame members 74 and 76 and is illustrated as 86g and 86e in FIGS. 3 and 4, respectively.

Figure 3:
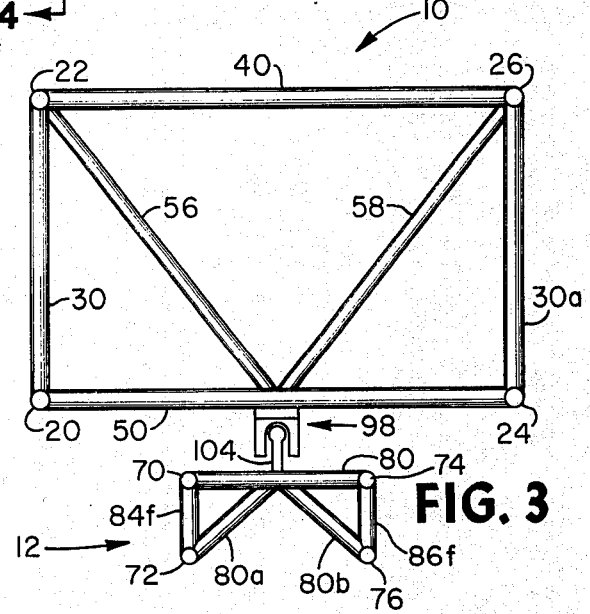
FIGS. 3 and 4 are views taken along lines 3—3 and 4—4 of FIG. 2, respectively.
Figure 4:
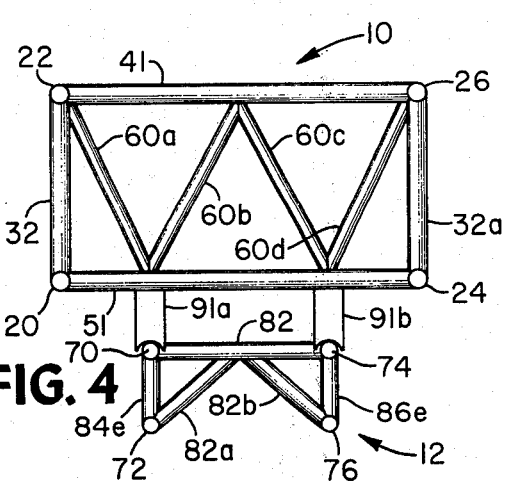

As also illustrated in FIGS. 3 and 4, tubular members 72 and 76 are connected to the midpoint of the spaced parallel braces extending between the members 74 and 70 to form a V-shaped support guide for movement of the formed pipe when the stinger 12 is in the operating position. In FIG. 4, the tubular support members 82a and 82b extend from the members 72 and 76, respectively, to the midpoint of the member 82 to form a guide for the pipe passing over the stinger 12. Preferably, rollers or similar means (not shown) are employed to reduce friction.

In the illustrated embodiment, ramp assembly 10 includes four spaced members 20, 22, 24 and 26 extending outwardly from the hull of the vessel and converging at a location adjacent pivot connection 14. As shown in FIG. 2, each of the members 20, 22, 24 and 26 is secured to the hull by welding or other desired manner with ends 20a and 22a illustrated. As illustrated in FIG. 4, the lower frame members 20 and 24 extend upwardly from the hull below the mean water level in a converging relationship with respect to the upper frame members 22 and 26, respectively, which extend downwardly from the vessel adjacent the working deck. The upper and lower support members 22 and 20 are secured at ends 22b and 20b (FIG. 2), respectively, to hinge member 28. The upper and lower members 26 and 24 are secured to a similar hinge member (not illustrated) in substantially the same manner with the spaced hinge members having aligned openings to receive pivot pin 14.

The ramp 10 includes suitable intermediate bracing. Parallel vertical intermediate members 30, 32, 34 and 36 are used to connect tubular members 22 and 20. As best illustrated in FIG. 4, tubular members 24 and 26 are joined by corresponding tubular vertical members, such as illustrated by numeral 32a, for the desired strength. The upper tubular frame members 22 and 26 are joined by substantially horizontal tubular frame members 40 and 41 (FIGS. 3 and 4). The lower tubular members 20 and 24 are also joined by substantially horizontal tubular members 50 and 51 in FIGS. 3 and 4 which illustrate the rectangular bracing frames formed at parallel spaced locations along outwardly extending tubular members 20, 22, 24 and 26.

In addition to the horizontal and vertical bracing members for the outwardly extending frame members 20, 22, 24 and 26, other bracing may be used, if desired. In FIG. 3, braces 56 and 58 extend downwardly from connection with the upper tubular members 22 and 26 to the approximate midpoint of the lower crossbrace 50 to support securing means 98 discussed below. In FIG. 4, support members 60a, 60b, 60c and 6d cooperate to form a "W" to brace the rectangular cross-section partially formed by the vertical brace member 32. In addition, suitable bracing may be provided between the brace members 30, 32, 34 and 36 as illustrated in FIG. 2. The bracing members 31a and 31b connect the ends of the brace members 30 with the midpoint of the brace 32. Brace 33a connects to the lower end of the vertical member 32 with the upper tubular member 22 adjacent the connection with the upper end of the vertical support member 34. Brace 33b extends between vertical members 34 and 36 in a similar manner.

In the illustrated embodiment of the ramp, the upper horizontal bracing members forming the rectangular cross-section braces, such as 40 and 41 in FIGS. 3 and 4, respectively, serve to support the pipe as it moves from the deck of the vessel across the ramp 10. Suitable pipe guiding and roller means of a type well known in the art (not shown) are secured to the substantially horizontal bracing members 40 and 41.

As illustrated in FIGS. 2 and 4, ramp 10 carries a plurality of downwardly extending positioning extensions or guides 90a and 91a on frame member 20 adapted to receive member 70 of stinger 12 when the stinger is in the folded under position shown in FIG. 2. In the preferred embodiment, downward extension 90a engages the longitudinal member 70 adjacent the vertical support member 34 while extension 91a engages the member 70 adjacent the vertical support member 32. Both extensions 91a and 90a have corresponding opposite downward extensions designated by numerals 91b and 90b, respectively, for engaging the opposite longitudinal member 74 of stinger 12 in the secured position. All of the downward extensions are formed with the surfaces engaging the frame members 70 and 74 to receive these members in a manner such as to resist lateral movement of the stinger 12 relative to the ramp assembly 10.

The stinger 12 is provided with a cable attachment means 94 for a cable C which extends around pulley P mounted on the vessel upwardly to a winch or draw works (not illustrated) on the vessel. The cable and winch are used for moving the stinger 12. When the stinger is in the operating position (FIG. 1) the cable is attached to the ramp assembly 10 adjacent the hinge member 28 by means of a suitable releasable shearing clip 95. During pipelaying operations, this arrangement serves to prevent the cable from snagging on foreign objects and inadvertently moving the stinger 12. When it is desired to move the stinger 12, tension on the cable is increased. The increased tension releases the cable from the shearing clip 95 and permits the cable to align between the pulley P and the attachment 94 to facilitate pulling the stinger 12 to the tucked under position.

A releasably buoy (not illustrated) may be positioned on stinger 12 adjacent to cable attachment member 94. The releasable buoy can be connected to the attachment member 94 by a length of cable so that when the buoy is released and floats to the surface a tug or other service vessel may attach to the buoy and pull the stinger 12 outwardly from the vessel to the operating position. Those skilled in the art will recognize and adapt other means to effect movement of the stinger 12 to and from the operating and secured positions.

As illustrated in FIG. 3, means are provided for securing the stinger to the vessel when the stinger is in the tucked under position. The securing means, generally designated 98, is illustrated in detail in FIG. 5A and preferably comprises a locking surface formed on the stinger 12 cooperating with a detent means moving to engage the locking surface to secure the stinger 12 in the protected or retracted position. In the preferred embodiment, the movable detent means which engages the locking surface is mounted on the vessel on ramp 10 to simplify control of the movable detent from a remote position on the vessel. The securing means may also include, if desired, shock absorbing means to further reduce the effects of adverse weather on the pipe support apparatus.

Figure 5A:
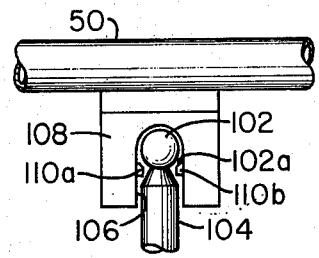
FIGS. 5A and 5B illustrate embodiments of the means for securing the pipe support apparatus in the protected position.

In the embodiment of the securing means illustrated in FIGS. 3 and 5A, a ball 102 is formed on the outer end of a locking extension member 104 secured to cross-brace member 80 of the stinger 12. When the stinger is disposed in the retracted or protected position the ball is received in an opening 106 formed in a locking housing 108. The housing 108 is secured to the lower brace member 50 below the connections with the braces 56 and 58 of the ramp assembly 10. Movably disposed in the housing 108 are a plurality of movable slips 110a and 110b which move radially inwardly to engage the neck or lower portion of the spherical locking outer surface 102a of the ball 102 as illustrated in the lower section view portion of FIG. 5A. The slips 110a and 110b move radially outwardly from the opening 106 into the housing 108 for releasing from engagement with the locking surface 102a of the ball. The locking rings or slips 110a and 110b of the securing means in FIG. 5A wedge on the ball neck 102a in response to the application of hydraulic pressure.

Figure 5B:
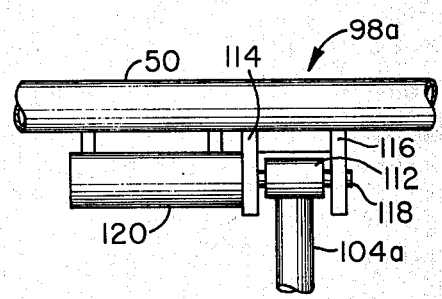

Another embodiment of the securing means is generally designated 98a in FIG. 5B. In this embodiment, a locking extension member 104a is affixed to a transverse tubular section 112 having an inner bore (not illustrated). When the stinger is in the protected position the opening through the tubular member is aligned with openings (not illustrated) through spaced locking members 114 and 116 which are secured to tubular member 50 of the ramp assembly. A locking pin 118 is movable through the aligned openings of the tubular member 112 and the locking members 114 and 116 to secure the stinger to the ramp assembly. As expansible chamber motor 120 is mounted on frame member 50 for advancing pin 118 to the locking position illustrated or for withdrawing the locking pin from the tubular member 112 to release the stinger to enable it to be moved to the operating position. For reliability and simplicity of operation, it is preferably that the expansible chamber means 120 be a double acting hydraulic piston and cylinder arrangement.

In the operation of the present invention, when pipe is being laid, connection of the pipe on the working deck D of the floating vessel V is performed in the normal manner. As additional tubular sections are added, the formed pipe is moved off of the working deck D onto the ramp 10 and stinger 12 over the pipe supports thereon. As the pipe moves down the ramp assembly and stinger, the position of the stinger may be adjusted to achieve the desired support angle of the stinger relative to that of the ramp. The frame members of the stinger may be hollow and be provided with bulkheads and suitable controllable valves so that the buoyancy of the stinger, and thus its position, may be controlled from the vessel. As illustrated in FIG. 1, the pipe support paths of the ramp assembly and the stinger are normally aligned, but slight variations may be desired for different pipe sizes. In addition, pipe tensioners normally will be disposed on the working deck to assist in supporting the pipe as it moves to the floor of the body of water. Such tensioners are well known in the art and may or may not be employed with the pipe support apparatus of the present invention.

When adverse weather conditions are encountered or advance warning is received, the pipe forming operations on the deck D are terminated and the formed continuous pipe is allowed to move overboard in a manner or condition enabling retrieval of the end of the pipe after the passage of the adverse weather conditions. With the formed pipe separated from the pipe support apparatus, the winch or draw works is employed to tighten cable C and shear the shearable attachment means to the hinge 28 and to cause thereafter movement of the stinger to the protected tucked under position.

When the stinger 12 is in the protected position, as illustrated in FIG. 2, securing means 98 are operated to move the slips 110a and 110b into engagement with the locking surface 102a of the ball 102 to secure the stinger to the ramp and vessel. With the stinger tucked under the vessel in the protected position and secured thereto, the stinger is protected from the effects of adverse weather conditions.

After the adverse weather conditions have passed, the slips 110a and 110b are moved outwardly to release the ball 102 for movement from the housing 108. While operation of the present invention has been discussed with respect to the securing means of FIGS. 3 and 5A, it will be appreciated that the securing means illustrated in FIG. 5B would be employed in a similar fashion. A buoy connected by cable to attachment 94 is released to float to the surface for enabling a work vessel to pull the stinger 12 outwardly from the floating vessel to the operating position. Other means may be employed to effect this latter movement including movement of the vessel in a direction tending to move the stinger assembly 12 to the operating position.

From the foregoing, it can be seen that the present invention affords several important advantages. By moving the stinger into the folded under position during rough weather rather than disconnecting the stinger from the vessel, potential damage that could occur during disconnection and reconnection are avoided. Further, the stinger may be returned to the operating position (FIG. 1) in rougher seas than those in which reconnection would normally be attempted, permitting more prompt resumption of pipe-laying operations. Also, when the stinger is folded under and securely held in place in the manner set forth above, it is less susceptible to damage than when floating, and does not endanger other vessels or structures. Further, in the event that adverse weather conditions occur rapidly, the stinger can be moved to the tucked under position before the end of pipe P is jettisoned into the water from the vessel V, permitting the vessel V to be secured against adverse weather more rapidly.

The foregoing disclosure and description of the invention are illustrative and explanatory thereof, and various changes in the size, shape, and materials as well as in the details of the illustrated construction may be made without departing from the spirit of the invention.

We claim:

1. Apparatus for supporting pipe as it is laid from a floating vessel comprising:
   a. a pipelaying stinger;
   b. means for pivotally connecting said stinger to said vessel, said pivotal connecting means located in a sufficient distance from the end of said vessel and a sufficient distance below the top of said vessel to permit said stinger to pivot from an operating position supporting the pipe to a protected position beneath said vessel so as to be able to be supported under the hull of said vessel;
   c. means for moving said stinger from an operating position supporting the pipe to a protected position beneath said vessel;
   d. the hull of said vessel being adapted inwardly and downwardly from the location of said pivotal connecting means to allow said stinger to pivot from an operating position supporting the pipe to a protected position beneath said vessel so as to be able to be supported under the hull of said vessel;
   e. a ball and socket adapted to secure said stinger to said vessel in the protected position; and
   f. means for locking said ball in said socket.

2. The apparatus of claim 1 wherein said locking means is activated from a remote position.

3. Apparatus for supporting pipe as it is laid from a floating vessel comprising;
   a. a pipelaying stinger;
   b. means for pivotally connecting said stinger to said vessel, said pivotal connecting means located a sufficient distance from the end of said vessel and a sufficient distance below the top of said vessel to permit said stinger to pivot from an operating position supporting the pipe to a protected position beneath said vessel so as to be able to be supported under the hull of said vessel;
   c. means for moving said stinger from an operating position supporting the pipe to a protected position beneath said vessel;
   d. the hull of said vessel being adapted inwardly and downwardly from the location of said pivotal connecting means to allow said stinger to pivot from an operating position supporting the pipe to a protected position beneath said vessel so as to be able to be supported under the hull of said vessel;
   e. a pin and sleeve adapted to secure said stinger to said vessel in the protected position; and
   f. means for locking said pin within said sleeve.

4. The apparatus of claim 3 wherein said locking means is activated from a remote position.

5. The apparatus of claim 3 further including guide means positioned on said vessel for resisting lateral movement of said stinger while in the protected position.

6. The apparatus of claim 3 wherein said vessel has a semi-submersible hull and including a ramp affixed to one end of said vessel, said means for pivotally connecting said vessel located at the outboard end of said ramp.

* * * * *